J. HAINES.
Harvester.
No. 12,907.
Patented May 22, 1855.
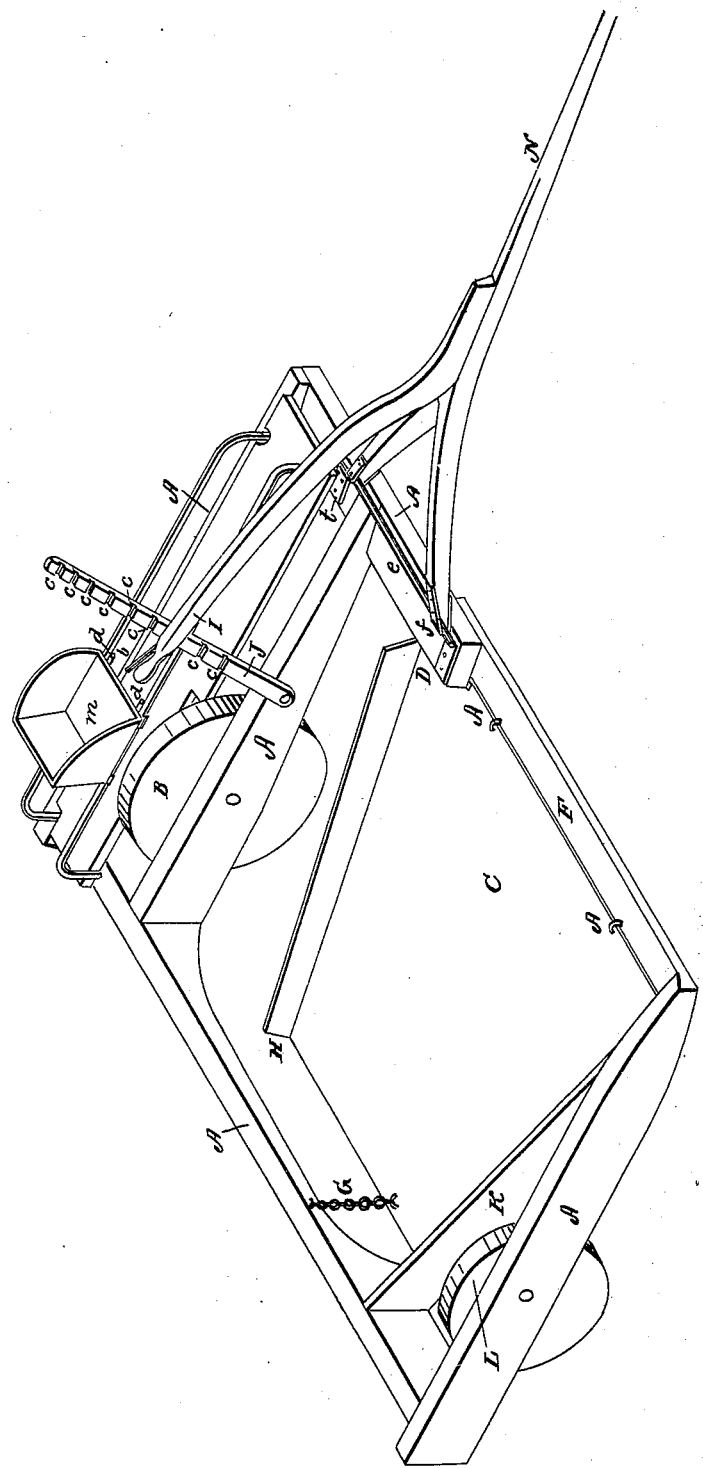

UNITED STATES PATENT OFFICE.

JONATHAN HAINES, OF PEKIN, ILLINOIS.

IMPROVEMENT IN GRAIN-HARVESTERS.

Specification forming part of Letters Patent No. 12,907, dated May 22, 1855.

*To all whom it may concern:*

Be it known that I, JONATHAN HAINES, of Pekin, in the county of Tazewell and State of Illinois, have invented certain new and useful Improvements in Harvesting-Machines; and I do hereby declare the following to be a full, clear, and exact description of the same, reference being had to the accompanying drawing, making a part thereof, and which represents a perspective view of so much of the machine as will illustrate my invention, omitting the other parts, which may be in any of the well-known forms.

The nature of my invention relates to the form and manner of hinging the platform in front and allowing its rear to drag over the stubble, for the several purposes of bending down the stubble, enabling the raker to more readily remove the gavel from the falling grain, aid the binders in gathering the cut grain, and for dropping the cut grain more evenly on the ground.

To enable others skilled in the art to make and use my invention, I will proceed to describe the same with reference to the drawing.

My invention is of that class known as "adjustable mowing and reaping machines," of which there are several kinds, and to distinguish mine more clearly from those most like it I shall speak briefly of their construction and operation. An adjustable machine is one wherein the main frame, which has the cutter-bar or finger-beam attached to it, is hinged to the tongue, either in front or in rear, and is adjusted to any suitable height by means of a lever while in motion. There are two modes of constructing or rather of arranging these machines. One is to place the tongue in the rear of the machine and propel it forward of the horses. Such a machine is used almost entirely for reaping grain. In the other plan the tongue is hinged in front and on the right-hand side of the driver. This latter is used for both reaping and mowing. There are many serious objections in the arrangement and connections of the parts of this latter machine, one of which is that the tongue or draft-bar, being placed on the right side of the machine, compels the driver either to hold the reins in his right hand or look across his left arm to watch the operation of the machine and look out for obstructions. Either of these positions are unnatural and quite uncomfortable. It also brings the adjusting-lever to the left hand of the driver, as his seat must necessarily be outside of the lever; and in these machines, also, the driver's seat has been a fixture, thereby depriving him of changing his position in order to balance the machine properly at all times while in operation, which would relieve the horses' necks from the weight of the tongue when cutting grain, as at that time the finger-beam, front of the machine and reel, &c., are held off the ground at any suitable height by means of the lever, and consequently throwing all the excess of weight forward of the axis of the supporting and driving wheels onto the draft-bar or tongue and ultimately onto the horses' necks. My aim has been to avoid these injurious effects of improperly-constructed machines, and which I have discovered by actual experience.

I construct my machine as follows: I make a frame, A A A A, of a rectangular form, and sufficiently wide to place the driving-wheel B some twenty inches from the end of the fingers next to it, thus giving room for the platform C, on which the grain falls, to extend beyond the cutters also, as at D. I hinge this platform C to the finger-beam F by hinges *a a*, and allow the rear end of said platform to drag on the ground, or as near the ground as the stubble will admit. The rear end of the platform is suspended to the rear cross-piece A by a chain, G, near the corner next the standing grain. By thus suspending the platform at one corner the opposite corner, H, will sink lower than the suspended one, and thus give a winding or sloping direction toward H, which is the point from which the grain is raked from the platform, and consequently facilitates the raking to that point. By extending the platform beyond the cutters next the driving-wheel D it admits of the gavel being first raked onto said extended point D, whence it is slid off immediately in the rear, the dragging platform having pressed down the stubble for the purpose, so that the gavel shall lie on top of the stubble, and making it much easier for the binders to take up the gavels, and, besides, enables them to take it up cleaner than when, as heretofore, it was dropped on the long and straight stubble. The gavels will also lie in better shape for binding, and altogether expedites that part of the labor.

To alter this machine for a mowing-machine for grass it is only necessary to unhinge and remove the platform C, confine the spring-catch b to the lever I by a cord or button, so that it will not take into any of the notches c in the standard J, and the finger-beam will play over the surface of the ground, conforming to all its undulations, the driver's seat having been run forward to cause his weight to hold the cutters to the ground. The lever and spring, standard and notches, are used in reaping, or in raising the cutters over any obstructions.

The chain G, besides suspending the platform, prevents it from catching or running into the ground when the machine is turned round to the right, which is the usual way of turning it.

K is a diagonal brace, extending from the outer corner of the machine and joined to the rear piece of the frame, which gives to the platform an oblique form corresponding to said brace. The outside supporting-wheel, L, is set between this brace and the extreme outside frame-piece A.

M is the driver's seat, mounted on rails $d$ $d$ so as to be moved forward or back at pleasure for balancing the machine.

N is the tongue, connected by a rod, $e$, to the frame at $f$ $f$. The lever I is fastened to this hinged tongue, and extends back to the driver's seat, so that he may easily grasp it.

Having thus fully described the nature of my invention, what I claim therein as new, and desire to secure by Letters Patent, is—

So hinging the platform to the finger-bar and frame as to facilitate the raking, break down the stubble, and leave the gavels in bet-condition to be gathered by the binders, substantially in the manner above set forth and described.

JONATHAN HAINES.

Witnesses:
THOMAS H. UPPERMAN,
EMIL COHEN.